Aug. 25, 1925.  
W. H. FITCH  
1,551,022  
RECUPERATING HEATING FURNACE  
Filed Oct. 1, 1923  2 Sheets-Sheet 1
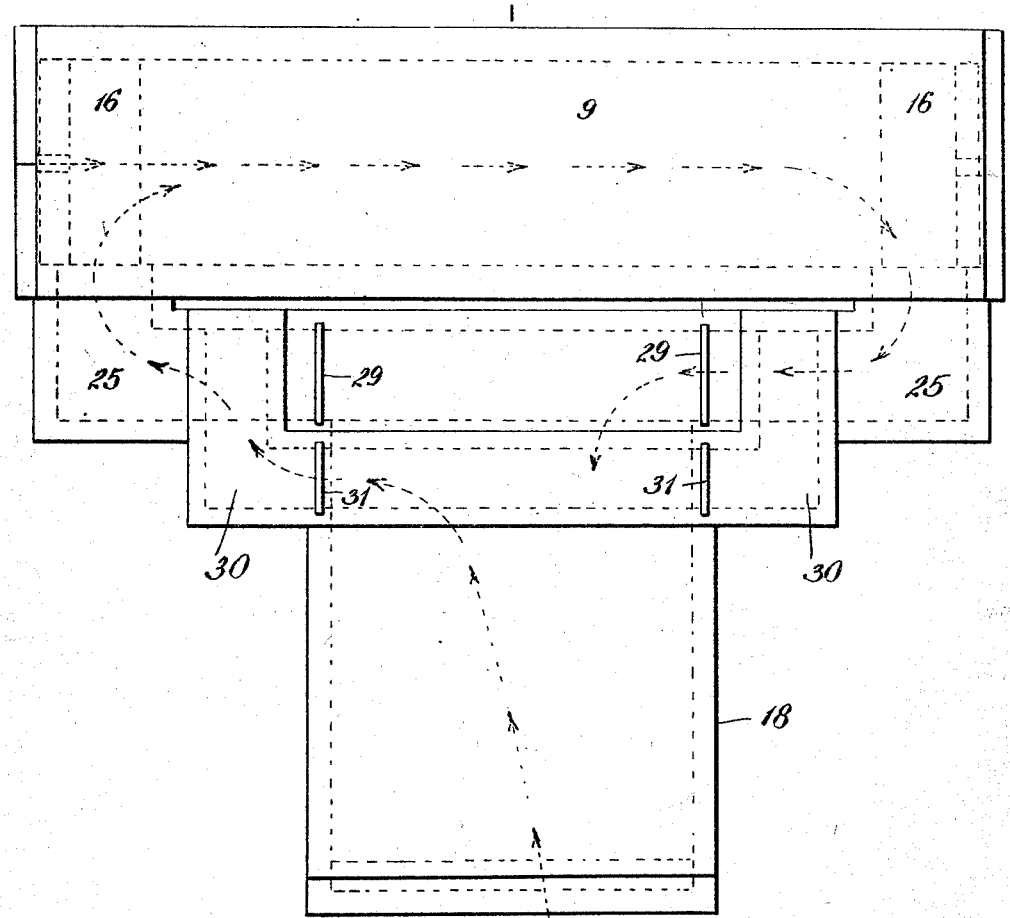
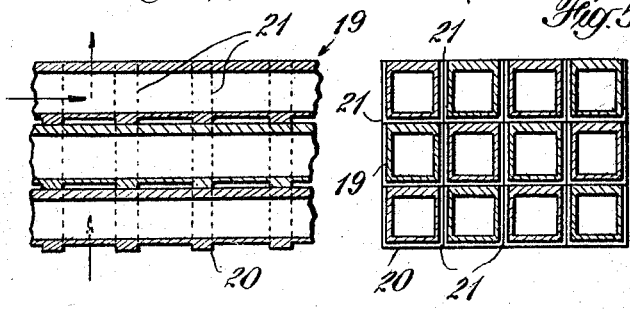
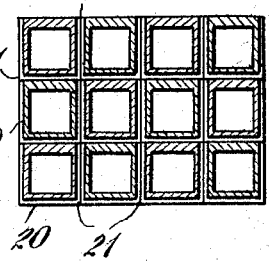
INVENTOR  
William Henry Fitch  
BY  
Pennie, Davis, Marvin, & Edmonds  
ATTORNEYS

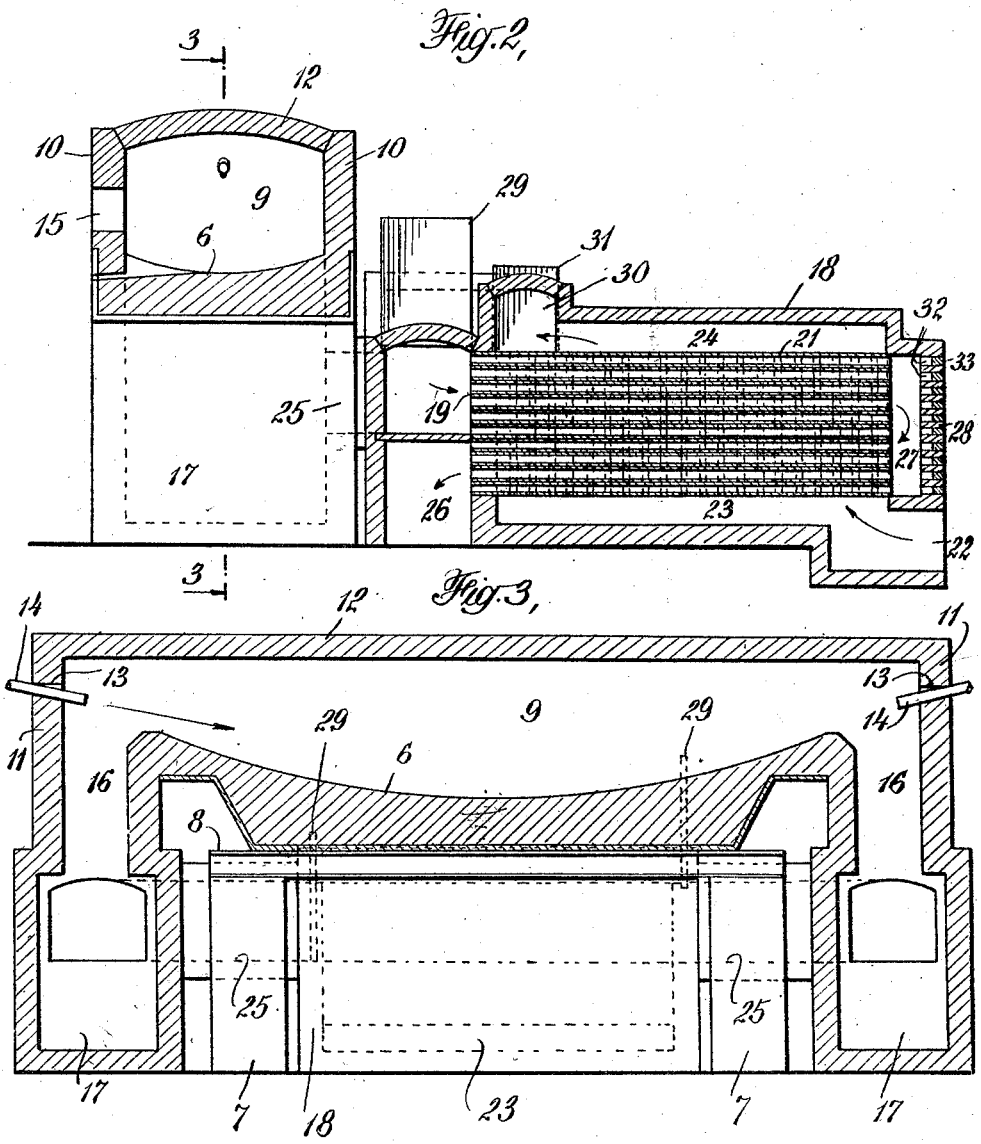

263. HEATING.

Patented Aug. 25, 1925.

1,551,022

UNITED STATES PATENT OFFICE.

WILLIAM HENRY FITCH, OF ALLENTOWN, PENNSYLVANIA.

RECUPERATING HEATING FURNACE.

Application filed October 1, 1923. Serial No. 665,955.

*To all whom it may concern:*

Be it known that I, WILLIAM HENRY FITCH, a citizen of the United States, residing at Allentown, in the county of Lehigh, State of Pennsylvania, have invented certain new and useful Improvements in Recuperating Heating Furnaces; and I do hereby declare the following to be a full, clear, and exact description of the invention, such as will enable others skilled in the art to which it appertains to make and use the same.

This invention relates to furnaces of the reversing type in which the direction of the flame is reversed, such as those used in the manufacture of steel and for melting various materials; and has for its object the provision of certain improvements in furnaces of this type wherein fuels of high calorific value, such as pulverized coal, may be employed, and the fuel consumption and cost of construction are materially reduced.

The present invention contemplates a furnace construction adapted for employing fuels of high calorific value, such as pulverized coal and embodies a recuperative unit for preheating atmospheric air, or other combustion supporting gas, by the heat from the waste gases from the combustion chamber. The invention also contemplates the provision of means for reversing and controlling the direction of flow of waste gases and air, or other combustion supporting gas between the combustion chamber and the recuperative unit.

In general, the furnace construction of the invention comprises a combustion chamber adapted for burning pulverized coal, or other fuels of high calorific value, and a recuperative unit for preheating air to support the combustion of the fuel in the combustion chamber. The recuperative unit comprises a plurality of substantially parallel waste gas pipes of tile, or other refractory material, preferably horizontally disposed and so constructed as to leave interstices, or passageways, therebetween for the circulation of air, or other combustion supporting gas, to be preheated. In a furnace construction for employing pulverized coal as a fuel, I provide a relatively large slag or dust chamber below the combustion chamber at either end thereof and communicating with the combustion chamber by an upwardly extending flue. The slag or dust chamber should be large enough to permit expansion of the gases and precipitation of molten or solid particles therefrom. A passageway leads from near the top of the slag or dust chamber to the waste gas tile or pipes of the recuperator, and is provided with a flue leading to the reservoir for preheated gas at the top of the recuperator. Where pulverized coal is used and ash is precipitated in the waste heat compartment of the recuperator, appropriately positioned apertures are formed in the wall of the recuperator to permit the insertion of a cleaning iron for displacing refuse deposits while the furnace is in operation.

The furnace construction of the present invention is adapted for use in the manufacture of steel, for melting various materials, and like operations, where regenerative furnaces are employed at the present time using producer gas as fuel. The cost of construction and upkeep of such furnaces is extremely large due to their complicated construction. On the other hand, the furnace construction of the present invention is comparatively simple and the cost of construction is relatively small. Moreover, the improved furnace construction is adapted for the successful use of fuels of high calorific value, particularly pulverized coal, with resulting increased economic advantages.

These and other features of the invention will be more clearly understood by reference to the following description and accompanying drawings, in which:

Fig. 1 is a plan view of the furnace construction of the invention;

Fig. 2 is a side elevation in section taken along line 2—2 of Fig. 1;

Fig. 3 is an end elevation in section taken along line 3—3 of Fig. 2;

Fig. 4 is a side sectional view of a portion of the tile or waste gas pipes of the recuperator; and Fig. 5 is a cross sectional view of the waste gas pipes shown in Fig. 4.

In the drawings I have illustrated a furnace construction comprising a melting hearth 6 of suitable refractory material supported in any appropriate manner, such as by columns 7 and I-beams 8. A combustion chamber 9 is provided above the melting hearth 6 by the enclosing side walls 10, end walls 11, and top cover 12, all of suitable refractory material. An opening 13 is provided in the end walls 11 for a fuel burner 14 of any suitable form. A charging door 15 for charging the melting hearth 6 is provided in the side wall 10. The end walls 11 are spaced from the ends of the melting hearth 6 to provide a vertical flue 16 at either end of the combustion chamber 9. A relatively large slag or dust chamber 17 is disposed at the bottom of the vertical flue 16 between the combustion chamber and a recuperator 18 and is of sufficient cubical content to permit expansion of the gases and precipitation of molten matter.

A plurality of substantially horizontally disposed waste gas pipes 19, preferably of square cross section, are suitably supported within the recuperator 18 and are preferably constructed of tile or other refractory material. The pipes 19 have a plurality of spaced external projections 20 upon which the adjacent pipes rest so as to form interstices or passageways 21 between the pipes for air, or other combustion supporting gas, which is to be preheated. The waste gas pipes 19 are located within the recuperator so as to provide an air inlet 22 and an air passage 23 at the bottom of the recuperator and a reservoir 24 for preheated air at the top of the recuperator. A passageway 25 connects one end of one portion, preferably an upper portion, of the waste gas pipes 19 with the slag or dust chamber at either end of the furnace, the remaining portion communicating with a flue 26 leading to the stack; a flue 27 in end wall 28 of the recuperator connects the opposite ends of both portions of the waste gas pipes 19.

A valve 29 is placed in the passageway 25 at the entrance of the latter into the recuperator. The reservoir 24 communicates with the passageway 25 by a flue 30 at a point between the valve 29 and the dust chamber 17. A valve 31 is placed in the flue 30 at its entrance into the reservoir 24.

I have provided apertures 32 in the end wall 28 of the recuperator to permit the insertion of a cleaning iron for displacing refuse deposits in the recuperator. The apertures 32 are normally closed by a cap or plug 33 which is adapted to be removed so that refuse deposits in the recuperator may be removed while the furnace is in operation. These expedients are of particular advantage when employing pulverized coal as fuel.

Under conditions which bring about a gas flow through the furnace as indicated by the arrows in Fig. 1, the valve 31 at the left will be open and the valve 29 at the left will be closed; while the valve 31 on the right will be closed and the valve 29 on the right will be open. In operation pulverized coal, or other fuel of high calorific value, is fed or injected from the burner 14, on the left of Fig. 3 for example, into the combustion chamber 9. Simultaneously, preheated air, or other combustion supporting gas, flows from the flue 16, at the left of Fig. 3, into the combustion chamber 9 to support the combustion of the fuel. The products of combustion, or waste heat gases, pass from the combustion chamber through the flue 16, at the right of Fig. 3, into the slag or dust chamber 17 where the gases expand and permit the precipitation of any molten matter, such as slag, from the melting material in the melting hearth 6. The waste gases flow from the dust chamber 17 into the passageway 25, through the upper portion of waste gas pipes 19 of the recuperator, down the flue 27, and through the remaining portion of waste gas pipes 19 into the flue 26 and stack.

Simultaneous with the flow of waste heat gases through the recuperator, air, or other combustion supporting gas, is drawn in through the inlet 22 and is preheated while passing through the interstices or passageways 21 between the waste gas pipes 19. The preheated air collects in the reservoir 24 and flows continuously into the flue 30, through passageway 25 and flue 16 to the combustion chamber 9.

The direction of flow of gases through the combustion chamber may be reversed at will by appropriate arrangement of the valves 29 and 31 in an open or closed position. Thus, to bring about a gas flow in the direction as indicated by the arrows in Fig. 1, the valve 31 at the left is opened and the valve 29 is closed, while the valve 31 at the right is closed and the valve 29 is opened. To reverse the direction of gas flow, the valve 29 at right and the valve 31 at the left in Fig. 1 are closed, while the valve 29 at the left and valve 31 at the right are opened. The preheated air then will flow from the reservoir 24 into the flue 30, through the passageway 25, and flue 16 at the right of Fig. 1, while the waste gases from the combustion chamber will flow down the flue 16, through the passageway 25 at the left of Fig. 1 into the waste gas pipes 19 of the recuperator.

When the furnace construction of the invention is fired with pulverized coal, ash is formed which settles and collects in large part in the relatively large slag or dust chamber 17. Some ash, however, gains access to the recuperator and would be objectionable if permitted to accumulate in the waste gas pipes 19 of the recuperator. In accordance with the invention means are provided for preventing such accumulations.

Thus, in accordance with the invention many advantages are derived. A fuel of high calorific value, particularly pulverized coal, may be successfully employed. The advantages of a furnace construction of this type in which the flame or direction of gas flow, may be reversed, and in which the gas for supporting the combustion of the fuel is preheated will be readily recognized by those skilled in the art. Moreover, the cost of the furnace construction of the invention is relatively small as compared with furnaces at present in use in the manufacture of steel and for melting various materials requiring high temperatures.

I claim:

1. In combination, a combustion chamber, a recuperator having a waste gas conduit operatively associated with a combustion supporting gas conduit for preheating the combustion supporting gas by heat of the waste gases from the combustion chamber, passages connecting the recuperator with either end of the combustion chamber, and means for controlling the flow of the combustion supporting gas and the waste gases through their respective conduits in the recuperator while reversing the direction of flow of such gases between the recuperator and the combustion chamber 2. In combination, a combustion chamber, a recuperator having a waste gas conduit operatively associated with a combustion supporting gas conduit for preheating the combustion supporting gas by heat of the waste gases from the combustion chamber, passages connecting the recuperator with either end of the combustion chamber, means for controlling the flow of the combustion supporting gas and the waste gases through their respective conduits in the recuperator while reversing the direction of flow of such gases between the recuperator and the combustion chamber, and a dust chamber interposed in said passages between the recuperator and the combustion chamber.

3. In combination, a combustion chamber, a recuperator having a waste gas conduit operatively associated with a combustion supporting gas conduit for preheating the combustion supporting gas by heat of the waste gases from the combustion chamber, passages connecting the recuperator with either end of the combustion chamber, and means for directing the flow of combustion supporting gas from its conduit in the recuperator to either end of the combustion chamber while directing the flow of gases of combustion from the opposite end of the combustion chamber to the waste gas conduit in the recuperator.

4. In combination, a combustion chamber, a recuperator having a waste gas conduit operatively associated with a combustion supporting gas conduit for preheating the combustion supporting gas by heat of the waste gases from the combustion chamber, passages connecting the recuperator with either end of the combustion chamber, means for controlling the flow of the combustion supporting gas and the waste gases through their respective conduits in the recuperator while reversing the direction of flow of such gases between the recuperator and the combustion chamber, and means permitting removal of dust deposits in the recuperator.

5. In combination, a combustion chamber, a recuperator having a waste gas conduit operatively associated with a combustion supporting gas conduit for preheating the combustion supporting gas by heat of the waste gases from the combustion chambers, an exterior passage connecting opposite ends of the combustion chamber and communicating with the waste gas conduit of the recuperator, another passage near each end of said exterior passage communicating with the combustion supporting gas conduit of the recuperator, and valves at the point of communication between said passages and the recuperator.

6. In combination, a combustion chamber, a recuperator having a waste gas conduit operatively associated with a combustion supporting gas conduit for preheating the combustion supporting gas by heat of the waste gases from the combustion chamber, a relatively large dust chamber at each end of the combustion chamber, an exterior passage connecting said dust chambers and communicating with the waste gas conduit of the recuperator, another passage near each end of said exterior passage communicating with the combustion supporting gas conduit of the recuperator, and valves at the point of communication between said passages and the recuperator.

7. In combination, a combustion chamber, a recuperator having a waste gas conduit operatively associated with a combustion supporting gas conduit for preheating the combustion supporting gas by heat of the waste gases from the combustion chambers, an exterior passage connecting opposite ends of the combustion chamber and communicating with the waste gas conduit of the recuperator, another passage near each end of said exterior passage communicating with the combustion supporting gas conduit of the recuperator, valves at the point of communication between said passages and the recuperator, and means permitting removal of dust deposits in the recuperator.

In testimony whereof I affix my signature.

WILLIAM HENRY FITCH.